United States Patent
Cowburn et al.

(10) Patent No.: US 10,257,563 B2
(45) Date of Patent: Apr. 9, 2019

(54) AUTOMATIC GENERATION OF NETWORK PAGES FROM EXTRACTED MEDIA CONTENT

(71) Applicant: Amazon Technologies, Inc., Seattle, WA (US)

(72) Inventors: Piers George Cowburn, London (GB); James William John Cumberbatch, Brighton (GB); Eric Michael Molitor, London (GB); Joshua Ceri Russell-Hobson, London (GB)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/670,575

(22) Filed: Aug. 7, 2017

(65) Prior Publication Data

US 2017/0339450 A1 Nov. 23, 2017

Related U.S. Application Data

(63) Continuation of application No. 14/029,123, filed on Sep. 17, 2013, now Pat. No. 9,762,950.

(51) Int. Cl.
| | |
|---|---|
| *H04N 1/00* | (2006.01) |
| *H04N 21/431* | (2011.01) |
| *H04N 21/233* | (2011.01) |
| *H04N 21/234* | (2011.01) |
| *H04N 21/4782* | (2011.01) |
| *H04N 21/8549* | (2011.01) |

(52) U.S. Cl.
CPC ....... *H04N 21/4316* (2013.01); *H04N 21/233* (2013.01); *H04N 21/23412* (2013.01); *H04N 21/23418* (2013.01); *H04N 21/4782* (2013.01); *H04N 21/8549* (2013.01)

(58) Field of Classification Search
CPC ........... H04N 1/00331; H04N 21/4316; H04N 21/233; H04N 21/23412; H04N 21/4782; H04N 21/8549
See application file for complete search history.

(56) References Cited

U.S. PATENT DOCUMENTS

| | | | |
|---|---|---|---|
| 6,614,930 B1 * | 9/2003 | Agnihotri | G06K 9/325 382/173 |
| 6,748,481 B1 | 6/2004 | Parry et al. | |
| 8,306,331 B2 | 11/2012 | Muramatsu et al. | |
| 8,320,674 B2 * | 11/2012 | Guillou | G06K 9/3266 382/164 |
| 8,989,491 B2 * | 3/2015 | Chattopadhyay | G06K 9/325 382/176 |
| 9,449,216 B1 | 9/2016 | Dhua et al. | |
| 9,876,982 B2 * | 1/2018 | Zhu | H04N 5/445 |
| 2005/0273827 A1 | 12/2005 | Javed et al. | |
| 2006/0064716 A1 | 3/2006 | Sull et al. | |

(Continued)

*Primary Examiner* — John R Schnurr
(74) *Attorney, Agent, or Firm* — Thomas | Horstemeyer, LLP

(57) ABSTRACT

Disclosed are various embodiments to extract portions of video or audio data from a media summary corresponding to a media content item available in a media content catalog according to one or more predefined rules. The extracted portions of video and audio data are used to generate one or more network pages detailing or describing the media content item.

18 Claims, 6 Drawing Sheets

(56) References Cited

U.S. PATENT DOCUMENTS

| | | | |
|---|---|---|---|
| 2006/0230331 A1* | 10/2006 | Abanami | G06Q 30/02 715/234 |
| 2008/0098432 A1* | 4/2008 | Hardacker | H04N 7/163 725/51 |
| 2008/0260346 A1 | 10/2008 | Sukeda et al. | |
| 2009/0009532 A1* | 1/2009 | Hallberg | G06K 9/325 345/636 |
| 2009/0073266 A1 | 3/2009 | Abdellaziz Trimeche et al. | |
| 2009/0142031 A1* | 6/2009 | Godtland | G11B 27/28 386/278 |
| 2009/0263038 A1 | 10/2009 | Luo et al. | |
| 2010/0123816 A1 | 5/2010 | Koh et al. | |
| 2010/0192178 A1* | 7/2010 | Candelore | G06K 9/325 725/39 |
| 2012/0121235 A1 | 5/2012 | Terasaki | |
| 2013/0016122 A1 | 1/2013 | Bhatt et al. | |
| 2014/0082646 A1* | 3/2014 | Sandland | H04N 21/44008 725/14 |
| 2014/0181668 A1 | 6/2014 | Kritt et al. | |
| 2014/0310748 A1* | 10/2014 | Dureau | H04N 21/4622 725/41 |
| 2016/0227282 A1* | 8/2016 | Chang | H04N 21/4332 |

* cited by examiner

AUTOMATIC GENERATION OF NETWORK PAGES FROM EXTRACTED MEDIA CONTENT

CROSS-REFERENCE TO RELATED APPLICATIONS

This application is a continuation of, and claims priority to, co-pending U.S. patent application entitled "AUTOMATIC GENERATION OF NETWORK PAGES FROM EXTRACTED MEDIA CONTENT," filed on Sep. 17, 2013, and assigned application Ser. No. 14/029,123, which is incorporated herein by reference in its entirety.

BACKGROUND

Many content providers offer the ability to stream, download, or otherwise consume content over a network. The content offered is often part of an extensive collection of content made available for consumption. These same content providers may often provide a user interface for browsing, viewing, and/or consuming the offered content.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to automatically generating network pages corresponding to media available for consumption from a media content catalog. Such network pages may include details such as the title, rating, category, synopsis or description and other information stored in the media content catalog to assist users in evaluating whether to consume a particular item of available media content. In some embodiments, the network page includes material automatically extracted from the item of media content according to various rules, such as images, music, or dialogue from a movie or selected portions of songs from an album.

Figure 1:
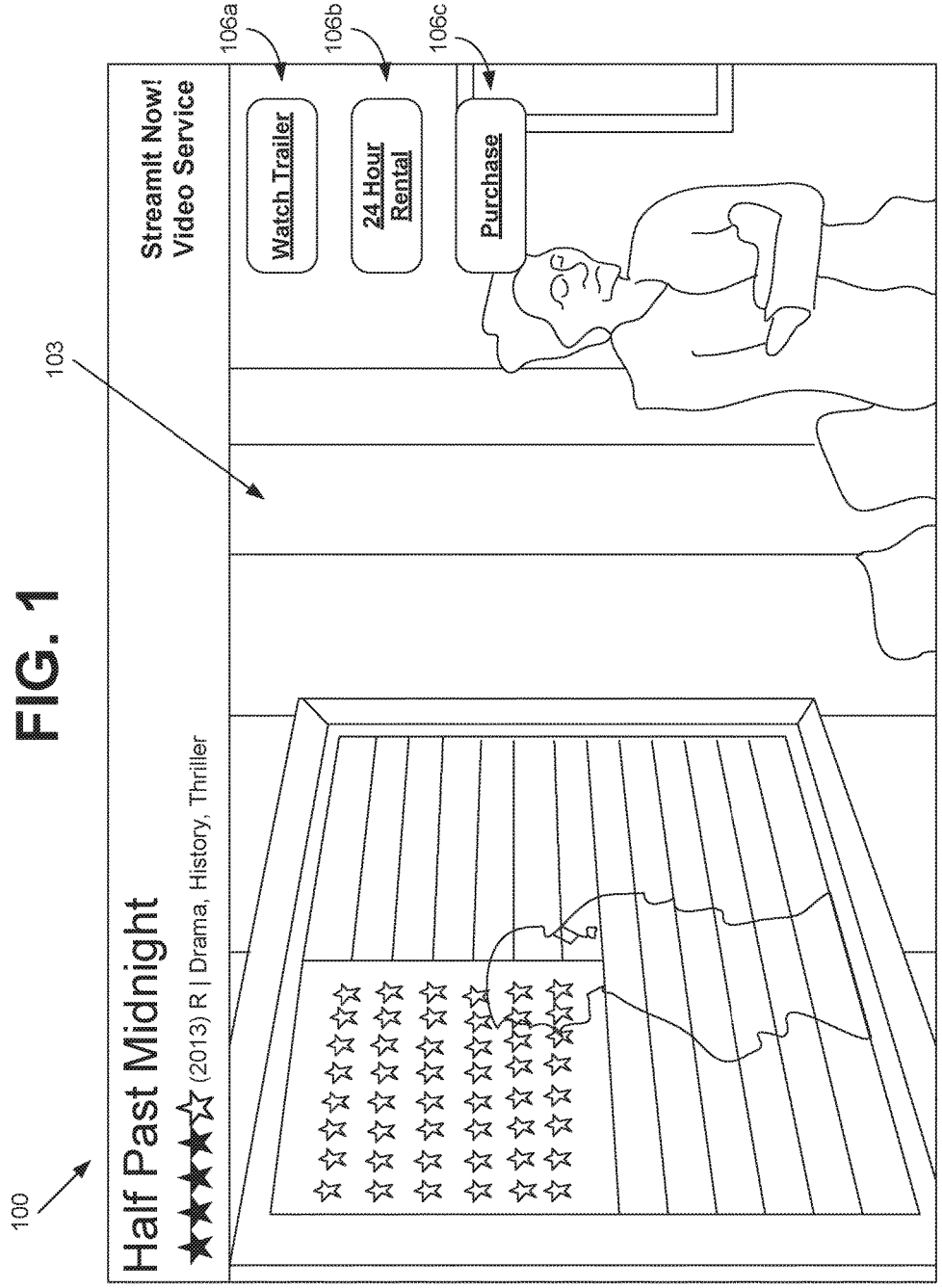
FIG. 1 is a drawing of a user interface for an example of a video streaming service according to various embodiments of the present disclosure.

Referring to FIG. 1, shown is an example of a network page 100 of a movie available through a video streaming service according to various embodiments of the present disclosure. The network page 100 may be presented through a television ("TV"), a TV set-top box, a video disc player such as a digital video disc ("DVD") player or a BluRay™ disc player, a gaming console device, a cellular phone or smartphone, a tablet, a web page presented through a web browser or similar application, or through some other means or apparatus.

The network page 100 includes a background image 103 extracted from a summary of the movie "Half Past Midnight," wherein the background image 103 was selected in accordance with various composition rules. The network page 100 also includes basic information describing the movie, including the Motion Picture Association of America ("MPAA") rating of the movie, the category of the movie, a rating of the movie, the year the movie was released, and potentially other information related to the movie. Overlaid over the background image 103 are multiple user interface controls 106a, 106b, and 106c that permit a user to interact with the video streaming service. For example, a user may be able to watch a summary of the move, rent the movie for a predetermined period of time, or purchase the movie. In the following discussion, a general description of the system and its components is provided, followed by a discussion of the operation of the same.

Figure 2:
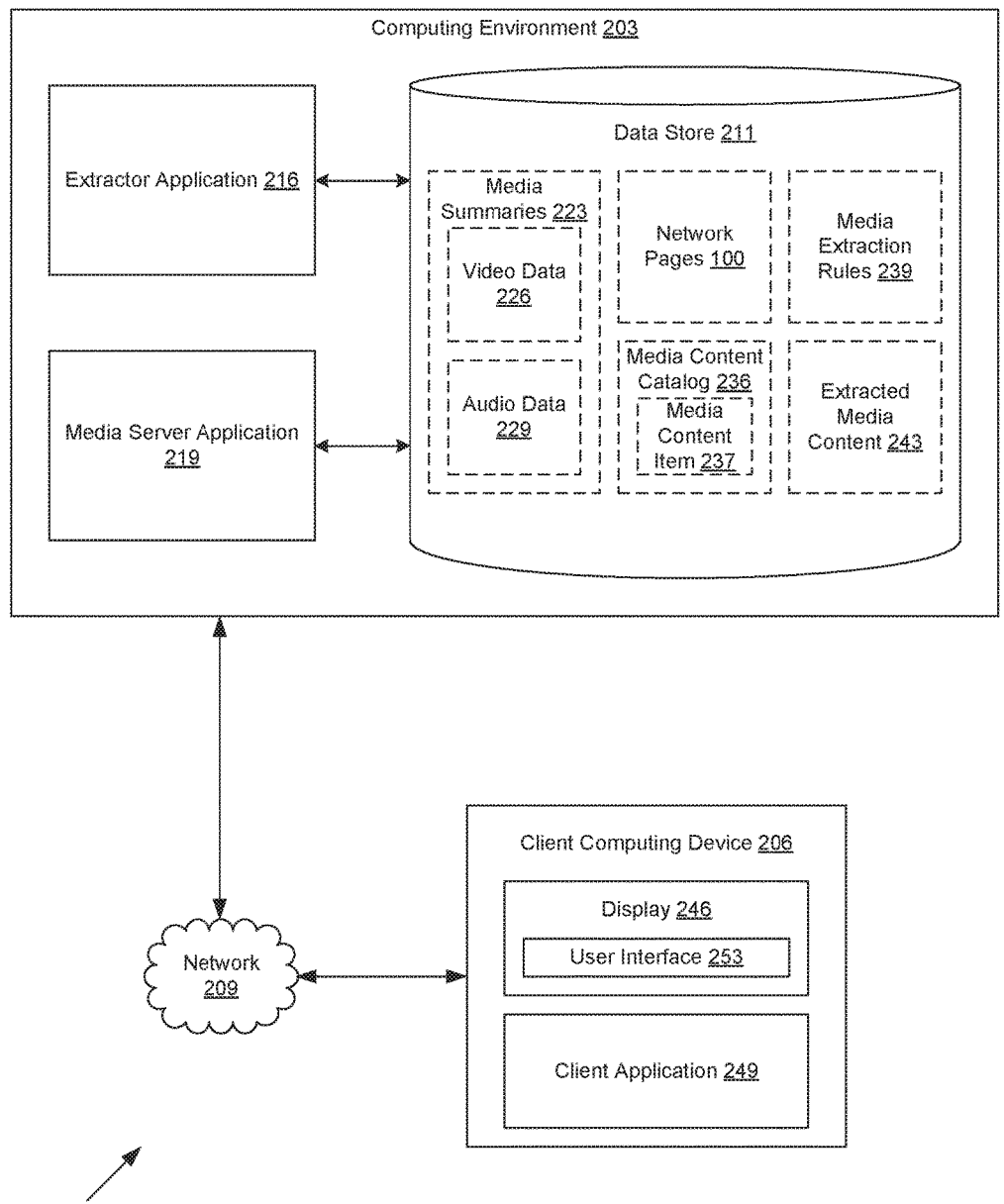
FIG. 2 is a schematic block diagram of a networked environment according to various embodiments of the present disclosure.

With reference to FIG. 2, shown is a networked environment 200 according to various embodiments. The networked environment 200 includes a computing environment 203 and a client computing device 206, which are in data communication with each other via a network 209. The network 209 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 211 that is accessible to the computing environment 203. The data store 211 may be representative of a plurality of data stores 211 as can be appreciated. The data stored in the data store 211, for example, is associated with the operation of the various applications and/or functional entities described below.

The components executed on the computing environment 203, for example, include an extractor application 216 and a media server application 219, and other applications, services, processes, systems, engines, or functionality not discussed in detail herein. The extractor application 216 is executed to analyze and extract selected portions of media content for use in generating one or more network pages 100. The media server application 219 is executed to respond to requests for media content from client computing devices 206, which may include requests for one or more network pages 100.

The data stored in the data store 211 includes, for example, media summaries 223, including video data 226 and audio data 229 portions of the media summaries 223, network pages 100, a media content catalog 236 comprising one or more media content items 237, media extraction rules 239, extracted media content 243, and potentially other data.

Media summaries 223 may include a shortened series of selected portions of a corresponding media content item 237 available in the media content catalog 236. For example, if the media content item 237 is a movie or television episode or series, then the corresponding media summary 223 may include a series of selected shots, scenes, or dialogue excerpts from the media content item 237. Since the purpose of media summaries 223 is often to advertise the corresponding media content item (e.g., a movie trailer or TV show advertisement), the selected shots, scenes, dialogue excerpts, etc., may be drawn from the most exciting, funny, recognized or otherwise noteworthy parts of the media content item 237. Similarly, if the media content item 237 is a music album, for example, a symphony performed by an orchestra, then the corresponding media summary 223 may include a particularly well-known or recognized sonata, movement, or portion thereof selected from the symphony.

Some media summaries 223 may also include shots, scenes, dialogue, etc., created specifically for advertising purposes but that does not appear in the corresponding media content item 237. For example, a movie summary may include an action sequence that does not appear in the actual film, or the movie summary may include a frame with the title in a specific typeface or with descriptive marketing slogans in the specific typeface. Multiple media summaries 223 may correspond to the same media content item 237 in the media content catalog 236. For example, a popular movie may have multiple corresponding media summaries 223.

Video data 226 includes the video portion of the media summary 223. Video data 226 may be encoded in a number of formats, such as standards published by the Moving Pictures Experts Group ("MPEG") including MPEG-2, MPEG-4, H.264 and other formats published by MPEG or others. In some embodiments, the video data 226 of the media summary 223 is separate from the audio data 229 of the media summary 223. In other embodiments, video data 226 and audio data 229 may be combined in a single format, file, or storage container. For example, in some media summaries 223, the series of still frames comprising video data 226 may be stored separate from the audio tracks that comprise the audio data 229 of the media summary 223.

Audio data 229 includes the audio portion of the media summary 223. Audio data 229 may correspond to musical tracks in an album, or the musical score and dialogue of a movie, television episode, or other multimedia content. In some embodiments, audio data 229 may further comprise one or more channels that correspond to separate sound sources. For example, audio data 229 corresponding to a scene in a movie may have one channel dedicated to dialogue in one language, a second channel dedicated to dialogue in another language, another channel dedicated to music, such as background or scene music, and another channel dedicated to sound effects such as background noises, special effects sounds, etc. In those embodiments where audio data 229 includes multiple audio channels, each channel may further include audio sub-channels. For example, an audio channel representing background music may have a respective sub-channel dedicated to each instrument playing.

Network pages 100 include network content such as web pages that are provided to one or more client computing devices 206 in response to requests to the media server application 219. A network page 100 may include code that dynamically generates the network page 100 when requested by the client computing device 206. The code may be written in any suitable programming language such as, for example, PHP®, Perl®, Objective-C®, JAVA®, Ruby®, etc. Also, the network pages 100 may include code configured to be executed or interpreted within the client computing device 206 in order to facilitate dynamic rendering of the network page 100. Such code may be referred to as an executable and may be written in any suitable programming language such as, for example, JavaScript®, JAVA or other languages. Network pages 100 may also include static elements that may be expressed, for example, in hypertext markup language (HTML), extensible markup language (XML), and/or any other language suitable for creating network pages 100.

Network pages 100 may be generated or otherwise created, either in whole or in part, by the extractor application 216, by the media server application 219, or another application using extracted media content 243 selected by the extractor application 216. For example, network pages 100 may be generated to include background images such as individual frames of video data 226 extracted from a media summary 223. Network pages 100 may also include music extracted from audio data 229 of a media summary 223 playing on a loop when viewed. In some embodiments, network pages 100 may dynamically render a series of frames extracted from video data 226 or alternate between several tracks extracted from audio data 229, such as alternating between several songs or between different dialogues.

In some embodiments, network pages 100 may have corresponding templates so that individual network pages 100 may have a format similar to the format of other network pages 100. For example, network pages 100 may follow a template that provides for a common appearance, look, or style between network pages 100. To implement the template, the network page 100 may make use of a common cascading style sheet ("CSS") or other mechanism with variables for specifying background images, font, font color, foreground images and the location of foreground images, as well as dictating the layout of elements within the network pages 100.

In such embodiments, the extractor application 216 or the media server application 219 may set or specify values for the variables using the extracted media content 243. For example, the font and font color of a network page 100 may be specified using a font and font color identified in the extracted media content 243. In another example, the background color or image may be specified using a color or image identified in the extracted media content 243. Similarly, background sound may be specified using music or dialogue identified in the extracted media content 243. In other embodiments, the values for the variables in the template or CSS may be manually specified.

In some embodiments, the colors used in generating or rendering the network pages 100 may be based, in whole or in part, on colors present or prevalent in the media summary 223. For example, the extractor application 216 may extract a frame of video data 226 from the media summary 223 that includes a stylized title or logo of the corresponding media content item 237 in the media content catalog 236. The extractor application 216 may further determine the primary color or colors of the stylized title or logo and determine a complimentary color or colors of the primary color using a color wheel or similar mechanism.

Colors may be determined by identifying a color associated with individual points or pixels within individual frames of the media summary 223. For example, a weight array representing colors present in the media summary 223 may be used to determine the primary color or colors. For each point or pixel in the media summary 223 that has a particular color, a corresponding element in the weighted array may have its weight increased by the extractor application 216 to indicate the presence of the color. Elements in the weighted array with the greatest weights may represent colors that are most prevalent in the media summary 223, which may include the primary color or colors of the media summary 223. In some embodiments, individual frames of the video data 226 of the media summary 223 may have their own weighted array representing colors present in the particular frame. In such embodiments, elements within the weighted array with the greatest weights correspond to the colors that are most prevalent in the particular frame.

The media content catalog 236 is a catalog of media content items 237 which may be provided by the media server application 219 in response to one or more requests received from the client computing device 206. In some embodiments, the media content items 237 may be available for download by the client computing device 206 across the network 209. In other embodiments, the media content items 237 within the media content catalog 236 may be available through other distribution channels, such as mail rental.

The media content items 237 may include digital or similar electronic media. For example, media content items 237 within the media content catalog 236 may include digital video content such as movies, television show episodes, and user produced video content such as home or family movies or videos. Media content items 237 within the media content catalog 236 may also include digital audio content such as digital music files or digital audio recordings.

Media extraction rules 239 are rules used by the extractor application 216 to determine whether to extract a frame, segment, or other portion of a media summary 223. Media extraction rules 239 may include basic filtering rules for identifying particular segments of video data 226 or audio data 229 within a media summary 223. For example, media extraction rules 239 may include a number of facial detection or recognition rules for determining whether a particular character in a movie or television show appears in the media summary 223. Media extraction rules 239 may also include various facial expression recognition rules. For example, one or more media extraction rules 239 may define parameters for determining whether a person is smiling, frowning, laughing, crying, scowling, screaming, or conveying some other facial expression. In some embodiments, the media extraction rules 239 may specify required thresholds, levels, or values for sharpness or brightness of a frame or the amount or level of motion blur within a frame. In various embodiments, the media extraction rules 239 may also specify thresholds, levels, or values for acceptable levels of image detail within a frame of video data 226 or a portion of a frame of video data 226. The media extraction rules 239 may also include various beat detection, speech detection, and voice recognition rules to determine if a particular segment of audio data 229 of the media summary 223 is music, dialogue, or other content.

The media extraction rules 239 may also include predefined composition rules useful for evaluating frames of video data 226 or segments of audio data 229. For example, media extraction rules 239 may include definitions analyzing compliance of a frame of video data 226 with compositional rules such as the Rule of Thirds, Rabatment of the Rectangle, Headroom, and Leadroom, so that the extractor application 216 can determine whether a particular frame or image in the video data 226 portion of the media summary 223 is an appropriate candidate from a compositional point of view for use in assembling a network page 100.

Extracted media content 243 includes portions of video data 226 or audio data 229 of a media summary 223 extracted by the extractor application 216 for use in generating, creating, or otherwise assembling network pages 100 corresponding to media content items 237 in the media content catalog 236. The portions of video data 226 may include individual frames of video data 226 or short sequences, scenes or montages of video data 226. The portions of audio data 229 may include short segments of audio, such as a few lines of dialogue from a movie, television episode, or other digital video content. The portions of audio data 229 may also include segments of music, a song, or other audio content. In some embodiments, individual audio channels may be extracted from the audio data 229, such as a channel corresponding to a single instrument in a musical song or score or a voice channel corresponding to a particular voice in a dialogue. The portions of audio data 229 may include individual tracks, such as tracks from a music album.

The client computing device 206 is representative of a plurality of client computing devices 206 that may be coupled to the network 209. The client computing device 206 may comprise, for example, a processor-based system such as a computer system. Such a computer system may be embodied in the form of a desktop computer, a laptop computer, personal digital assistants, cellular telephones, smartphones, digital televisions, set-top boxes, music players, web pads, tablet computer systems, game consoles, electronic book readers, or other devices with like capability. The client computing device 206 may include a display 246. The display 246 may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client computing device 206 may be configured to execute various applications such as a client application 249 and/or other applications. The client application 249 may be executed in a client computing device 206, for example, to access network content served up by the computing environment 203 and/or other servers, thereby rendering a user interface 253 on the display 246. To this end, the client application 249 may comprise, for example, a browser, a dedicated application, etc., and the user interface 253 may comprise a network page, an application screen, etc. The client computing device 206 may be configured to execute applications beyond the client application 249 such as, for example, email applications, social networking applications, word processors, spreadsheets, and/or other applications.

Next, a general description of the operation of the various components of the networked environment 200 is provided. To begin, the extractor application 216 processes all or a predetermined or predefined subset of the media content items 237 in the media content catalog 236 to determine whether any media content items 237 do not have at least one corresponding network page 100 in the data store 211 associated with the media content item. The extractor application 216 subsequently determines whether a media summary 223 exists in the data store 211 that corresponds to the media content item 237. If a corresponding media summary 223 is found, then the extractor application 216 processes the media summary 223 to extract one or more portions or segments of the media summary 223 according to one or more media extraction rules 239.

The extracted portions or segments of the media summary 223 are stored as extracted media content 243 and are subsequently used to generate one or more network pages 100 corresponding to the media content item 237. For example, a background image of the network page 100 may include a frame extracted from the video data 226 or a stylized logo, title, or slogan extracted from the video data 226. In some embodiments, the colors used in the creation of the network page 100, such as colors for the text, background, or user interface elements of the network page 100, may include portions of a color palette determined by the extractor application 216 to be used in the media summary 223.

In various embodiments of the present disclosure, the extractor application 216 may further refine extracted portions or segments of the media summary 223 and save the refined portions or segments as the extracted media content 243. For example, the extractor application 216 may adjust a transparency value of a frame of video data 226 in the media summary 223. As another example, the extractor application 216 may cut or select a title, slogan, logo, or other text, image or region from the frame of the video data 226 and store the title, slogan, logo or other text, image or region as the extracted media content 243.

In some embodiments of the present disclosure, the extractor application 216 may send the extracted media content 243 and the corresponding media extraction rule or rules 239 to a manual review system that employs a plurality of independent agents who are compensated on a per-task basis. In such embodiments, the extractor application 216 may further create a task with the manual review system, wherein the task specifies that at least one of the plurality of independent agents is to confirm that the extracted media content 243 complies with the media extraction rule 239 or meets other manual review criteria. The extractor application 216 then updates the media extraction rule 239 using a machine learning technique, such as a support vector machine, a sparse learning dictionary, a Bayesian network, a representative learning technique, or similar method or approach.

The network page 100 is subsequently generated using the extracted media content 243. According to some embodiments of the present disclosure, the network page may be subsequently generated by the extractor application 216 upon completion of the extraction process. In other embodiments of the present disclosure, the media server application 219 will generate the network page 100 in response to receiving a request from a client computing device 206 for the network page 100. In still other embodiments of the present disclosure, another dedicated application operating in the computing environment 203 may be used to generate network pages 100 from the extracted media content 243.

Next, the network page 100 is provided to the client computing device 206 by the media server application 219 in response to one or more requests from the client computing device 206 to the media server application 219. For example, a user of the client computing device 206 may be browsing the available media content items 237 in the media content catalog 236. The user may wish to receive more information related to a particular media content item 237 and therefore may send a request from the client computing device 206 to the media server application 219 for the network page 100 containing more detailed and descriptive information of the media content item 237.

Figure 3:
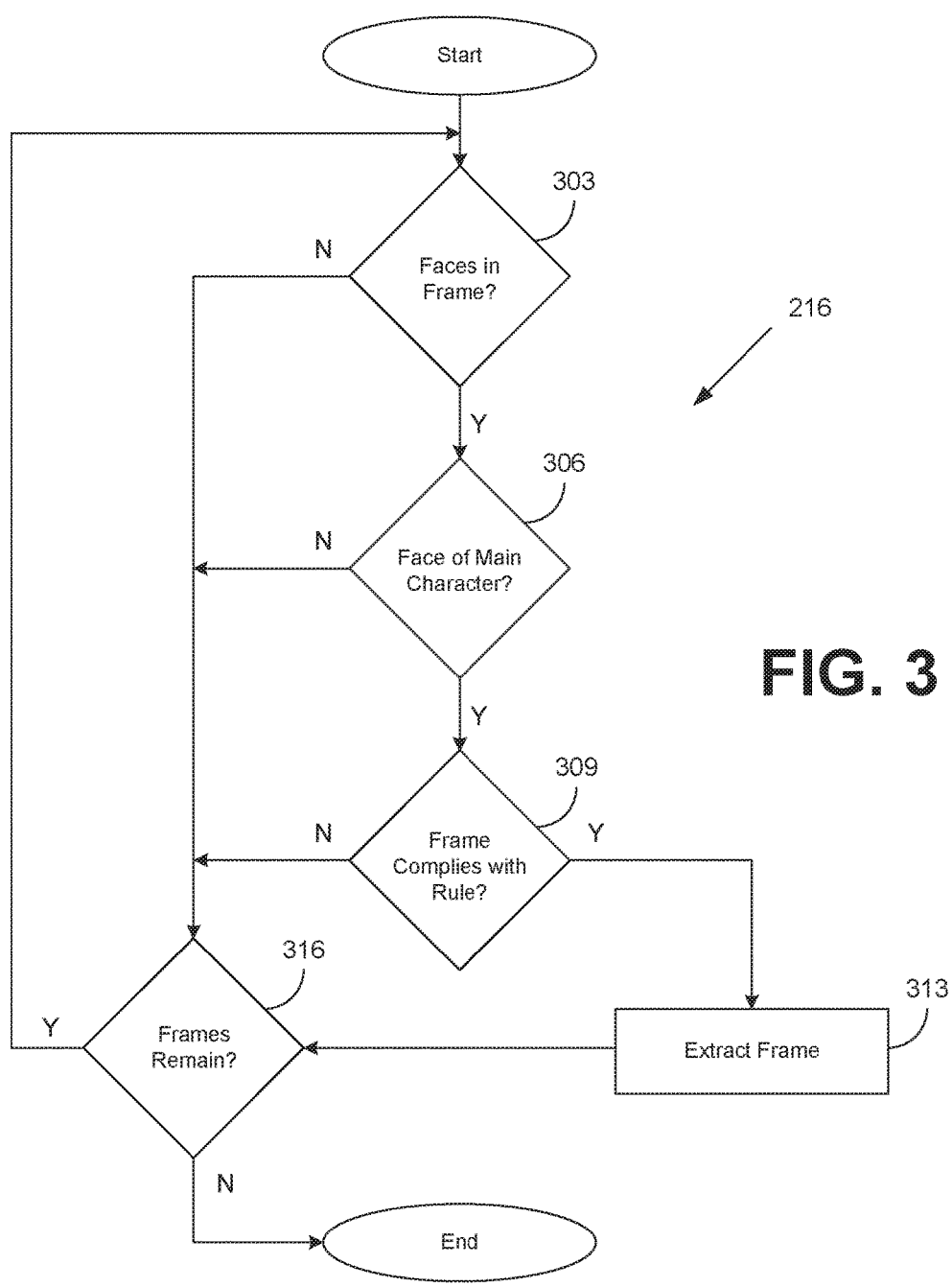
FIG. 3 is a flowchart illustrating one example of functionality implemented as portions of an extractor application executed in a computing environment in the networked environment of FIG. 2 according to various embodiments of the present disclosure.

Referring next to FIG. 3, shown is a flowchart that provides one example of the operation of a portion of the extractor application 216 according to various embodiments. It is understood that the flowchart of FIG. 3 provides merely an example of the many different types of functional arrangements that may be employed to implement the operation of the portion of the extractor application 216 as described herein. As an alternative, the flowchart of FIG. 3 may be viewed as depicting an example of elements of a method implemented in the computing environment 203 (FIG. 2) according to one or more embodiments.

Beginning with box 303, the extractor application analyzes a frame of video data 226 (FIG. 2) in the media summary 223 (FIG. 2) to determine if faces are present in the frame. In some embodiments, face detection methods instead of facial recognition methods are utilized because face detection may often be simpler and/or cheaper than facial recognition. If faces are detected in the frame of video data 226, the extractor application 216 determines if the number of faces detected is less than a number of faces specified by a media extraction rule 239 (FIG. 2). For example, a large number of faces detected in the frame of video data 226 may indicate that the frame of video data 226 comprises a picture of a crowd of people or comprises a picture taken from a distance. In contrast, a small number of faces or even the presence of only a single face in the frame of video data 226 might indicate that the frame of video data 226 includes only important characters or performers. If the extractor application 216 determines that the frame of video data 226 includes no faces or includes a number of faces greater than the number specified by the media extraction rule 239, execution proceeds to box 316. Otherwise, execution proceeds to box 306.

Moving on to box 306, the extractor application 216 performs facial recognition on the frame of video data 226 to determine if one or more of the faces correspond to a main actor or character. To make the determination, the extractor application 216 may use information in the media content catalog 236 (FIG. 2) to identify names of the main performers or characters and then compare known images of the main performers or characters to the faces detected in the frame of video data 226. If the extractor application 216 determines that none of the faces detected in the frame of video data 226 correspond to a face of a main performer or character, execution proceeds to box 316. However, if the extractor application 216 determines that the frame of video data 226 includes the face of one or more of the main performers or characters, then the extractor application 216 proceeds to box 309.

Referring next to box 309, the extractor application 216 determines whether the frame of video data 226 complies with one or more composition parameters specified by one or more media extraction rules 239. For example, the extractor application 216 may evaluate whether the frame of video data 226 has a level or value of image sharpness or motion blur that falls within an acceptable range of values specified by a media extraction rule 239.

The extractor application 216 may also determine whether the level of image detail within the frame of video data 226 or a portion of the frame of video data 226 complies with a threshold, parameter, or other value specified by one or more media extraction rules 239. For example, frames of video data 226 with little detail or sections with little detail may be useful as background images for network pages 100 because the sections with little detail permit foreground elements of the network pages 100 to be easily seen.

For frames of video data 226 that include one or more faces, the extractor application 216 may analyze the facial expressions to determine if they comply with one or more media extraction rules 239. For example, media summaries 223 categorized as comedies may have a corresponding media extraction rule 239 specifying that only frames of video data 226 with faces that are smiling or with expressions indicating laughter are to be extracted. In another example, media summaries 223 categorized as horror may have a corresponding media extraction rule 239 specifying that only frames of video data 226 with faces that are screaming or with expressions indicating fear or surprise are to be extracted.

In some embodiments, the extractor application 216 may perform various computer vision or related blob detection techniques to determine the location of major compositional elements or features of the frame of video data 226 and then determine whether the determined locations comply with the various composition parameters specified by one or more media extraction rules 239. For example, the composition parameters specified may correspond to compositional rules such as the Rule of Thirds, Rabatment of the Rectangle, Headroom, Lead Room, or other compositional rules regarding the placement of objects in a visual setting.

If the frame of video data 226 does not comply with at least one of the media extraction rules 239 evaluated, execution proceeds to box 316. However, if the frame of video data 226 does comply with at least one of the media extraction rules 239 evaluated, execution proceeds to box 313.

Moving on to box 313, the extractor application 216 extracts the frame of video data 226 or a portion thereof. In some embodiments, the extractor application 216 may copy the frame of video data 226 or the portion thereof to a collection of extracted media content 243 (FIG. 2) corresponding to the media summary 223 being processed. In other embodiments, the extractor application 216 may insert a pointer, link, or similar identifier in the collection of extracted media content 243 that provides a reference to the frame of video data 226 or the particular portion of the frame of video data 226.

In some embodiments, the extractor application 216 may further create and store metadata regarding the frame of video data 226 as part of the extraction process. For example, the extractor application 216 may store metadata associated with the frame of video data 226 indicating that the frame of video data 226 includes major performers or characters of the media content item 237 in the media content catalog 236 corresponding to the media summary 223 being processed. In some embodiments, the identification of the major performers or characters may be stored as part of the metadata.

Proceeding next to box 316, the extractor application 216 determines if any additional frames of video data 226 remain to be analyzed. If additional frames of video data 226 await processing, then the extractor application 216 proceeds to evaluate the next frame of video data 226 beginning at box 303. If no additional frames of video data 226 remain to be analyzed, then execution ends.

Figure 4:
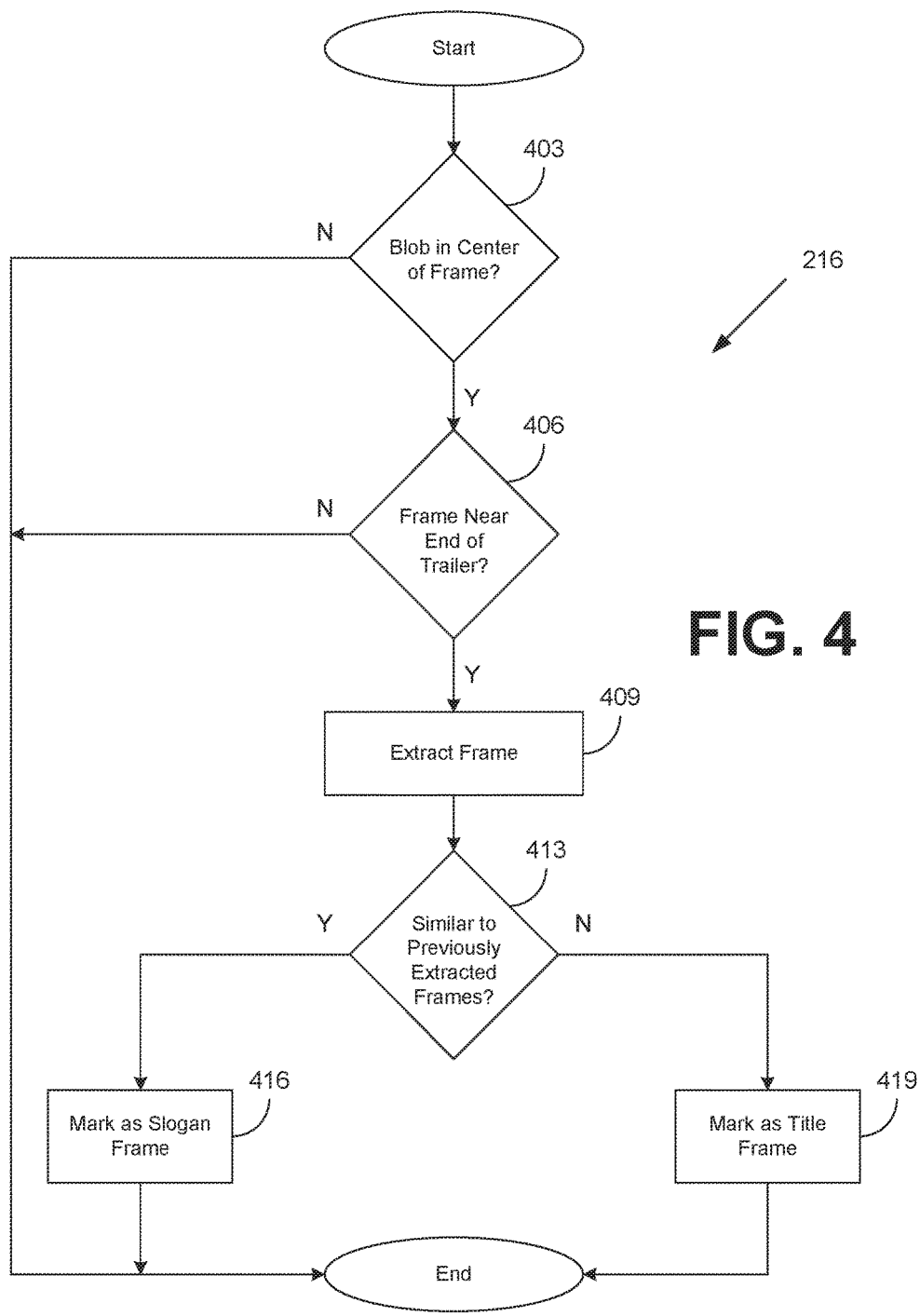
FIG. 4 is a flowchart illustrating one example of functionality implemented as portions of an extractor application executed in a computing environment in the networked environment of FIG. 2 according to various embodiments of the present disclosure.

Turning now to FIG. 4, shown is a flowchart that provides one example of the operation of another portion of the extractor application 216 according to various embodiments. It is understood that the flowchart of FIG. 4 provides merely an example of the many different types of functional arrangements that may be employed to implement the operation of the other portion of the extractor application 216 as described herein. As an alternative, the flowchart of FIG. 4 may be viewed as depicting an example of elements of a method implemented in the computing environment 203 (FIG. 2) according to one or more embodiments.

Beginning with box 403, the extractor application 216 applies any one of a number of image identification, computer vision, or blob detection techniques, such as the Laplacian of the Gaussian, the Difference of Gaussians, the Determinant of the Hessian, or other approaches, to a frame of video data 226 (FIG. 2) to determine the location of an arbitrary blob within the frame of video data 226. A blob is a region of a digital image, such as a frame of video data 226, in which some properties of the points within the region are constant or vary within a prescribed or predefined range of values. If a blob is detected, the extractor application 216 determines the relative location of the blob within the frame of video data 226. If the extractor application 216 determines that the blob is centrally located within the frame of video data 226, then the blob likely represents a slogan or logo in a stylized font or representation and execution proceeds to box 406. If the extractor application 216 does not detect a blob or determines that the blob is not centrally located within the frame of video data 226, then processing of the frame of video data 226 by the extractor application ends.

Proceeding to box 406, the extractor application 216 determines whether the frame of video data 226 is near the end of the media summary 223 (FIG. 2). To make the determination, the extractor application 216 may compare a timestamp or a relative position within a sequence of frames of video data 226 to a media extraction rule 239 (FIG. 2) specifying a threshold value defining whether the frame of video data 226 is near the end of the media summary 223. For example, the media extraction rule 239 may specify that all frames of video data 226 within the last 30 seconds of the media summary 223 are near the end of the media summary 223. In another example, the media extraction rule 239 may specify that the last 720 frames of video data 226 comprise the set of frames near the end of the media summary 223. If the extractor application 216 determines that the frame of video data 226 is near the end of the summary, then the blob within the frame of video data 226 likely represents a slogan or logo in a stylized font or representation and execution proceeds to box 409. Otherwise, the extractor application stops processing the frame of video data 226.

Moving on to box 409, the extractor application 216 extracts the frame of video data 226. In some embodiments, the extractor application 216 may copy the frame of video data 226 to a collection of extracted media content 243 (FIG. 2) corresponding to the media summary 223 being processed. In other embodiments, the extractor application 216 may insert a pointer, link, or similar identifier in the collection of extracted media content 243 that provides a reference to the frame of video data 226.

In some embodiments, the extractor application 216 may further create and store metadata regarding the frame of video data 226 as part of the extraction process. For example, the extractor application 216 may store metadata associated with the frame of video data 226 indicating that the frame of video data 226 includes a stylized representation of the title of, or a stylized slogan describing, the media content item 237 (FIG. 2) in the media content catalog 236 (FIG. 2) corresponding to the media summary 223 being processed. In instances where a font or a script used for the title or slogan can be identified, for example using optical character recognition ("OCR"), the metadata may also include the font or the script used.

Referring next to box 413, the extractor application 216 determines whether the extracted frame of the video data 226 is similar to previously extracted frames of the video data 226 that have been marked as potentially containing the title of or a slogan for the corresponding media content item 237. For example, if the extracted frame of the video data 226 is similar to previously extracted frames of the video data 226, then the detected blob within the extracted frame of the video data 226 is likely to be a slogan. In this case, execution proceeds to box 416 and the extracted frame of the video data 226 is tagged, for example with generated metadata, as including a slogan. In contrast, if the extracted frame of the video data 226 is not similar to previously extracted frames of the video data 226, the detected blob is likely to be the title because the title is usually rendered or presented in a distinctive font, color scheme or palette, or otherwise presented or rendered in a unique way to make the title easily recognizable. In this case, execution proceeds to box 419 and the extracted frame of the video data 226 is tagged, for example with generated metadata, as including the title. Whether execution proceeds to box 416 or box 419, execution thereafter subsequently ends.

Figure 5:
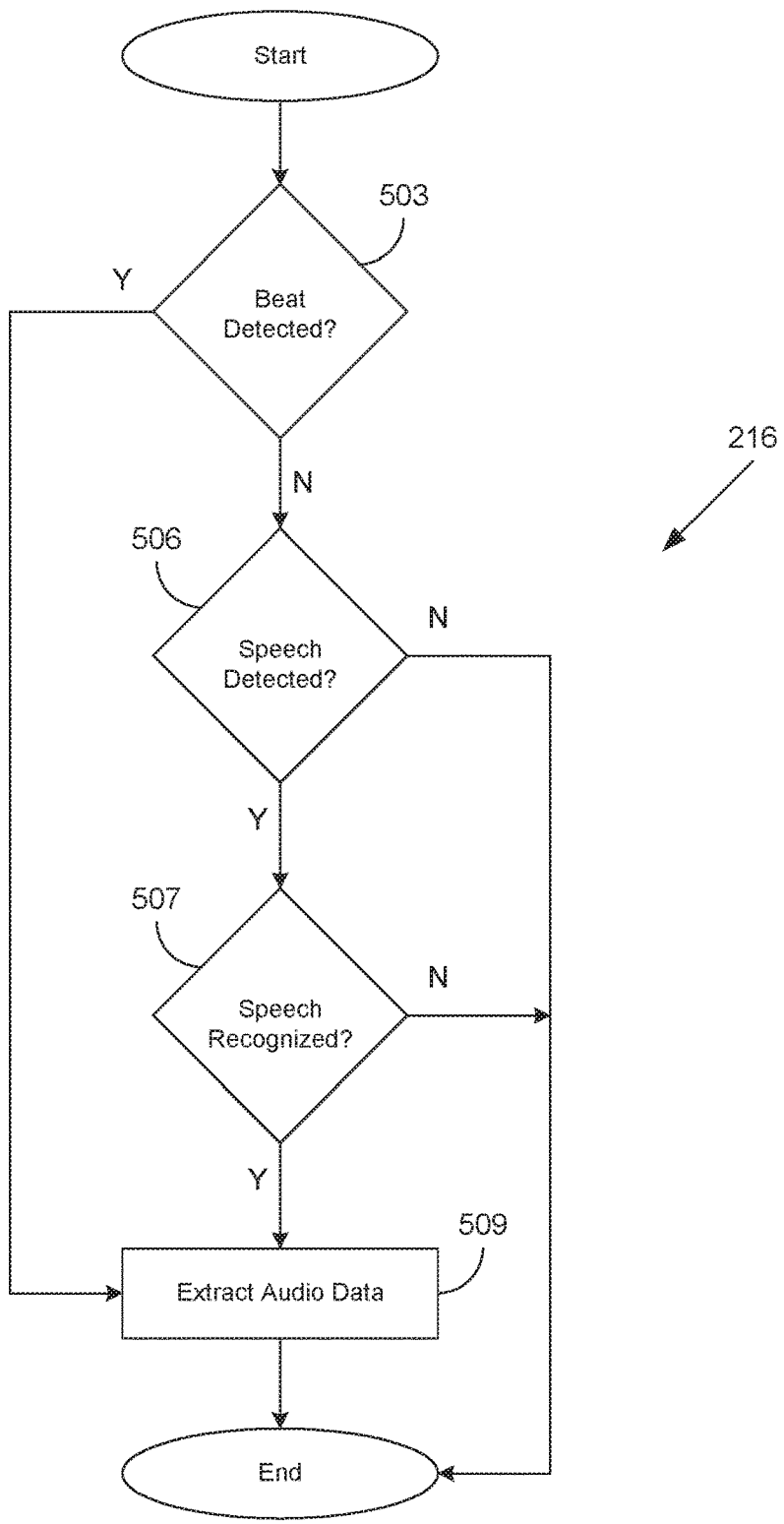
FIG. 5 is a flowchart illustrating one example of functionality implemented as portions of an extractor application executed in a computing environment in the networked environment of FIG. 2 according to various embodiments of the present disclosure.

Moving on to FIG. 5, shown is a flowchart that provides one example of the operation of yet another portion of the extractor application 216 according to various embodiments. It is understood that the flowchart of FIG. 5 provides merely an example of the many different types of functional arrangements that may be employed to implement the operation of this portion of the extractor application 216 as described herein. As an alternative, the flowchart of FIG. 5 may be viewed as depicting an example of elements of a method implemented in the computing environment 203 (FIG. 2) according to one or more embodiments.

Beginning with box 503, the extractor application 216 analyzes audio data 229 (FIG. 2) from the media summary 223 (FIG. 2), or a segment or portion of the audio data 229, to determine if the audio data 229 contains a beat. The extractor application 216 may do so by applying any one of a number of beat detection methods or approaches. In those embodiments where the audio data 229 includes multiple channels and/or sub-channels, the extractor application 216 may analyze each channel and/or sub-channel independently or concurrently. If a beat is detected, execution proceeds to box 509. If a beat is not detected, execution proceeds to box 506.

Moving on to box 506, the extractor application 216 determines whether the audio data 229 or the segment or portion of the audio data 229 includes speech or voices. The extractor application 216 may do so using any of a number of speech detection methods or approaches. In some embodiments, the extractor application 216 may use additional speech or voice recognition methods or approaches to determine if detected speech belongs to a main performer or character associated with the corresponding media content item 237 (FIG. 2) in the media content catalog 236 (FIG. 2). If speech is detected, then execution proceeds to box 507. If speech is not detected, then execution ends.

Proceeding next to box 507, the extractor application 216 performs one or more speech recognition methods on the audio data 229. For example, the extractor application 216 may compare the detected speech within the audio data 229 to one or more known samples of speech associated with one or more known performers in the media summary 223. In some embodiments, these samples of speech may be specified by one or more media extraction rules 239. In various embodiments, the media extraction rules 239 may include a speech or voice signature and specify specific parameters for matching the detected speech with the speech of voice signature, as well as acceptable levels of deviation from the specific parameters. If the speech is recognized, then execution proceeds to box 509. If the speech is not recognized, then execution ends.

Referring next to box 509, the extractor application 216 extracts the audio data 229 or the segment or portion of the audio data 229 according to one or more media extraction rules 239 (FIG. 2). For example, the media extraction rule 239 may specify that dialogue involving a particular individual or that a specific line should be extracted. In some embodiments, the extractor application 216 may copy the audio data 229 or the segment or portion of the audio data 229 to a collection of extracted media content 243 (FIG. 2) corresponding to the media summary 223 being processed. In other embodiments, the extractor application 216 may insert a pointer, link, or similar identifier in the collection of extracted media content 243 that provides a reference to the audio data 229 or the segment or portion of the audio data 229.

In some embodiments, the extractor application 216 may further create and store metadata regarding the audio data 229 or the segment or portion of the audio data 229 as part of the extraction process. For example, the extractor application 216 may store metadata associated with the audio data 229 or the segment or portion of the audio data 229 indicating that the audio data 229 or the segment or portion of the audio data 229 corresponds to dialogue involving a particular performer or character or a segment of a song that was a Billboard® Top 40 or Top 100 song. After the audio data 229 or the segment or portion of the audio data 229 is extracted, execution subsequently ends.

Figure 6:
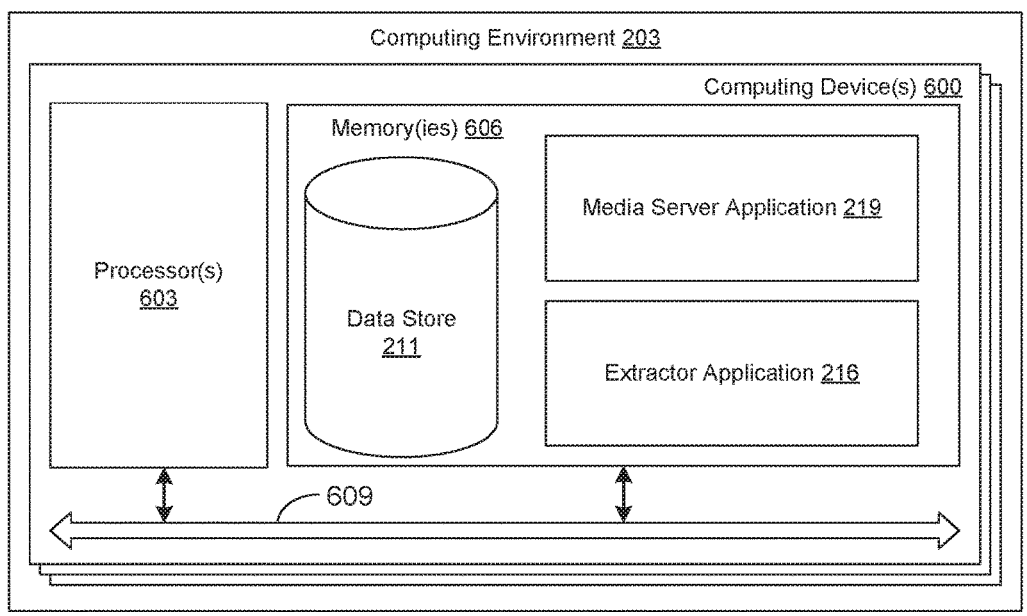
FIG. 6 is a schematic block diagram that provides one example illustration of a computing environment employed in the networked environment of FIG. 1 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the extractor application 216, the media server application 219, and potentially other applications. Also stored in the memory 606 may be a data store 211 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective-C®, JAVA®, JavaScript®, Perl®, PHP®, Visual Basic®, Python®, Ruby®, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the extractor application 216, the media server application 219, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3, 4, and 5 show the functionality and operation of an implementation of portions of the extractor application 216. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3, 4, and 5 show a specific order of execution, it is understood that the order of execution may differ from that which is depicted. For example, the order of execution of two or more blocks may be scrambled relative to the order shown. Also, two or more blocks shown in succession in FIGS. 3, 4, and 5 may be executed concurrently or with partial concurrence. Further, in some embodiments, one or more of the blocks shown in FIGS. 3, 4, and 5 may be skipped or omitted. Similarly, in other embodiments, additional steps may be included within the order of execution depicted in FIGS. 3, 4, and 5. For example, FIG. 3 may include additional steps related to image recognition of objects, FIG. 4 may include additional steps involving text recognition or optical character recognition, and FIG. 5 may include additional steps involving recognition of specific sound effects. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the extractor application 216 and the media server application 219, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein including the extractor application 216 and the media server application 219, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   determining, by at least one computing device, that a frame of a digital video file includes a centrally located region in which at least one property varies less than a predefined range of values;
   determining, by the at least one computing device, that the frame is within a threshold number of frames of an end of the digital video file;
   determining, by the at least one computing device, whether the centrally located region corresponds to a title or a slogan of the digital video file; and
   generating, by the at least one computing device, a network page including an image extracted from the frame based at least in part on whether the centrally located region is determined to correspond to a title or a slogan of the digital video file.

2. The method of claim 1, further comprising performing, by the at least one computing device, an optical character recognition process on the centrally located region to determine a font used in the centrally located region.

3. The method of claim 2, wherein at least a portion of the network page is generated to use the font determined to be used in the centrally located region.

4. The method of claim 1, wherein determining that the frame of the digital video file includes the centrally located region further comprises applying, by the at least one computing device, a blob detection technique on the frame comprising at least one of: a Laplacian of a Gaussian technique, a Difference of Gaussians technique, or a Determinant of a Hessian technique.

5. The method of claim 1, wherein determining whether the centrally located region corresponds to the title or the slogan of the digital video file further comprises determining, by the at least one computing device, whether the frame is similar to at least one previously extracted frame of the digital video file.

6. The method of claim 1, wherein the digital video file corresponds to a summary of a movie or a summary of at least a portion of a television series.

7. A system, comprising:
   at least one computing device; and
   at least one application executable in the at least one computing device, wherein when executed the at least one application causes the at least one computing device to at least:
   determine that a frame of a digital video file includes a centrally located region in which at least one property varies less than a predefined range of values;
   determine that the frame is within a threshold number of frames of an end of the digital video file;
   determine whether the centrally located region corresponds to a title or a slogan of the digital video file; and
   generate a network page including an image extracted from the frame based at least in part on whether the centrally located region is determined to correspond to a title or a slogan of the digital video file.

8. The system of claim 7, wherein when executed the at least one application further causes the at least one computing device to at least perform an optical character recognition process on the centrally located region to determine a font used in the centrally located region.

9. The system of claim 8, wherein at least a portion of the network page is generated to use the font determined to be used in the centrally located region.

10. The system of claim 7, wherein determining that the frame of the digital video file includes the centrally located region further comprises applying a blob detection technique on the frame comprising at least one of: a Laplacian of a Gaussian technique, a Difference of Gaussians technique, or a Determinant of a Hessian technique.

11. The system of claim 7, wherein determining whether the centrally located region corresponds to the title or the slogan of the digital video file further comprises determining whether the frame is similar to at least one previously extracted frame of the digital video file.

12. The system of claim 7, wherein the digital video file corresponds to a summary of a movie or a summary of at least a portion of a television series.

13. A non-transitory computer-readable medium storing instructions executable in at least one computing device, wherein when executed the instructions cause the at least one computing device to at least:
   determine that a frame of a digital video file includes a centrally located region in which at least one property varies less than a predefined range of values;
   determine that the frame is within a threshold number of frames of an end of the digital video file;
   determine whether the centrally located region corresponds to a title or a slogan of the digital video file; and generate a network page including an image extracted from the frame based at least in part on whether the centrally located region is determined to correspond to a title or a slogan of the digital video file.

14. The non-transitory computer-readable medium of claim 13, wherein when executed the instructions further cause the at least one computing device to at least perform an optical character recognition process on the centrally located region to determine a font used in the centrally located region.

15. The non-transitory computer-readable medium of claim 14, wherein at least a portion of the network page is generated to use the font determined to be used in the centrally located region.

16. The non-transitory computer-readable medium of claim 13, wherein determining that the frame of the digital video file includes the centrally located region further comprises applying a blob detection technique on the frame comprising at least one of: a Laplacian of a Gaussian technique, a Difference of Gaussians technique, or a Determinant of a Hessian technique.

17. The non-transitory computer-readable medium of claim 13, wherein determining whether the centrally located region corresponds to the title or the slogan of the digital video file further comprises determining whether the frame is similar to at least one previously extracted frame of the digital video file.

18. The non-transitory computer-readable medium of claim 13, wherein the digital video file corresponds to a summary of a movie or a summary of at least a portion of a television series.

* * * * *